United States Patent
Akkiraju et al.

(10) Patent No.: US 11,204,965 B2
(45) Date of Patent: Dec. 21, 2021

(54) DATA ANALYTICS AND INSIGHTS BROKERAGE SERVICE

(71) Applicant: International Business Machines Corporation, Armonk, NY (US)

(72) Inventors: Rama Kalyani T. Akkiraju, Cupertino, CA (US); Karl J. Cama, Southlake, TX (US); Norbert Herman, Denver, CO (US); Shubhadip Ray, Secaucus, NJ (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 15/401,331

(22) Filed: Jan. 9, 2017

(65) Prior Publication Data

US 2018/0197085 A1    Jul. 12, 2018

(51) Int. Cl.
G06F 16/903     (2019.01)
G06N 5/02       (2006.01)

(52) U.S. Cl.
CPC .... *G06F 16/90335* (2019.01); *G06F 2216/03* (2013.01); *G06N 5/025* (2013.01)

(58) Field of Classification Search
CPC .......... G06F 2216/03; G06F 16/90335; G06N 5/025
See application file for complete search history.

(56) References Cited

U.S. PATENT DOCUMENTS

| | | | |
|---|---|---|---|
| 6,014,644 A * | 1/2000 | Erickson | G06Q 30/06 705/26.3 |
| 6,594,700 B1 * | 7/2003 | Graham | H04L 29/06 709/219 |
| 7,032,002 B1 | 4/2006 | Razvani et al. | |
| 7,729,709 B1 * | 6/2010 | Loeb | H04L 67/306 455/456.3 |
| 7,840,418 B2 * | 11/2010 | Schoenberg | G06F 19/3418 705/2 |
| 8,001,259 B2 | 8/2011 | Dettinger et al. | |
| 8,244,559 B2 | 8/2012 | Horvitz et al. | |

(Continued)

OTHER PUBLICATIONS

Cardie et al., "Noun Phrase Coreference as Clustering", Cornell University (1999). (Year: 1999).*

(Continued)

*Primary Examiner* — Alexey Shmatov
*Assistant Examiner* — Beatriz Ramirez Bravo
(74) *Attorney, Agent, or Firm* — Yee & Associates, P.C.

(57) ABSTRACT

Generating insight on a set of data is provided. A request for information regarding a specific topic is received from a client device corresponding to a requester. An analysis is performed on the request and a type of the information requested is determined based on the analysis. A set of information vendors is selected from a plurality of known information vendors based on the type of the information requested and other factors. Insights on the type of the information requested are obtained from the selected set of information vendors and an analysis is performed on the insights. A response to the request is generated based on the analysis of the insights on the type of the information requested that was obtained from the selected set of information vendors. The response to the request is sent to the client device corresponding to the requester.

15 Claims, 6 Drawing Sheets

(56) References Cited

U.S. PATENT DOCUMENTS

| | | | |
|---|---|---|---|
| 8,255,459 B2 | 8/2012 | Dettinger et al. | |
| 2005/0090227 A1 | 4/2005 | Rao et al. | |
| 2007/0130005 A1 | 5/2007 | Jaschke | |
| 2007/0265956 A1* | 11/2007 | Epstein | G06Q 40/04 |
| | | | 705/37 |
| 2009/0192941 A1* | 7/2009 | Fournier | G06Q 30/06 |
| | | | 705/51 |
| 2011/0137683 A1 | 6/2011 | Schoenberg | |
| 2014/0164167 A1* | 6/2014 | Taylor | G06Q 30/0611 |
| | | | 705/26.4 |
| 2014/0282915 A1 | 9/2014 | Tekwani | |
| 2015/0310021 A1* | 10/2015 | Alexander | G06F 16/2336 |
| | | | 707/748 |
| 2016/0260016 A1* | 9/2016 | Barrett | G06Q 10/00 |
| 2017/0053295 A1* | 2/2017 | Tiell | G06Q 30/0631 |
| 2017/0185914 A1* | 6/2017 | Chawla | G06N 5/04 |

OTHER PUBLICATIONS

Zhu et al., "Adaptive Information Brokerage of Multiple Storage Nodes in Optical Sensor Networks", Optik—International Journal for Light and Electron Optics, vol. 126, No. 23, Dec. 2015, pp. 4358-4361.

* cited by examiner

DATA ANALYTICS AND INSIGHTS BROKERAGE SERVICE

BACKGROUND

1. Field

The disclosure relates generally to data analytics and insights and more specifically to generating an aggregate insight on a set of data based on obtaining insights on the set of data from a set of service providers corresponding to a set of component parts of an insight request made by an insight requester.

2. Description of the Related Art

Big Data and Analytics allow businesses to gain valuable insights on the behaviors of their customers and allow them to come up with innovative ways to personalize the customer experience. The Internet of Things has dramatically increased the amount of data being generated and analyzed. Many of these new sources of data never existed a few short years ago. For example, data is now collected from connected devices, personal wearable devices, and even jet engines.

Four types of data analytics currently exist that businesses may utilize to learn from and better engage with their customers. A first type is descriptive analytics. Descriptive analytics is, for example, information obtained from browsers or web servers via online tools. A business may quickly understand "what happened" during a specified period of time in the past and verify whether a particular campaign was successful or not with customers based on simple parameters, such as webpage views. However, it should be noted that thousands of metrics exist, such as, for example, number of posts, mentions, fans, followers, page views, kudos, check-ins, pins, and the like.

A second type is diagnostic analytics. Diagnostic analytics goes deeper into the data collected from customers in order to understand "why some things happened." Businesses may utilize business intelligence tools to obtain the desired insights on the collected data. However, diagnostic analytics is time intensive with a limited ability to provide actionable insights. Basically, diagnostic analytics provide a very good understanding of a limited piece of the problem to be solved.

A third type is predictive analytics. Predictive analytics collect contextual data and correlate the contextual data with other customer behavior datasets. In addition, predictive analytics expand customer data beyond what is obtained from browsers or web servers. Predictive analytics enter a new area where real insights on the data may be obtained. Essentially, predictive analytics predict what happens when things are kept as they are or the status quo is maintained. Predictive analytics utilize a variety of statistical, modeling, data mining, and machine learning techniques to study recent and historical data. As a result, predictive analytics allow analysts to make predictions about the future. Sentiment analysis is an example of a type of predictive analytics. The input to the predictive analytic model is plain text and the output of that predictive analytic model is a sentiment score. The sentiment score may be, for example, positive, negative, or something between +1 and −1. In this example, the predictive analytic model computes the sentiment score, but the predictive analytic model is not necessarily predicting the future. Rather, the predictive analytic model is predicting data that hasn't been obtained, which is the sentiment label of a positive or negative sentiment.

A fourth type is prescriptive analytics. Prescriptive analytics is an emerging technology that goes beyond descriptive and predictive analytic models by recommending one or more courses of action and showing likely outcomes of each action decision. Once a business gets to the point where the business can consistently analyze its customer data to predict what's going to happen, the business is very close to being able to understand what the business should do in order to maximize good customer outcomes and also to prevent potentially bad customer outcomes. It is from the last two types of data analytics above that a business can really get the insights the business needs to drive business outcomes.

SUMMARY

According to one illustrative embodiment, a computer-implemented method for generating insight on a set of data is provided. A computer receives a request for information regarding a specific topic from a client device corresponding to a requester. The computer performs an analysis on the request and determines a type of the information requested based on the analysis. The computer selects a set of information vendors from a plurality of known information vendors based on the type of the information requested and other factors. The computer obtains insights on the type of the information requested from the selected set of information vendors and performs an analysis on the insights on the type of the information requested that was obtained from the selected set of information vendors. The computer generates a response to the request based on the analysis of the insights on the type of the information requested that was obtained from the selected set of information vendors. The computer sends the response to the request to the client device corresponding to the requester. According to other illustrative embodiments, a computer system and computer program product for generating insight on a set of data are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
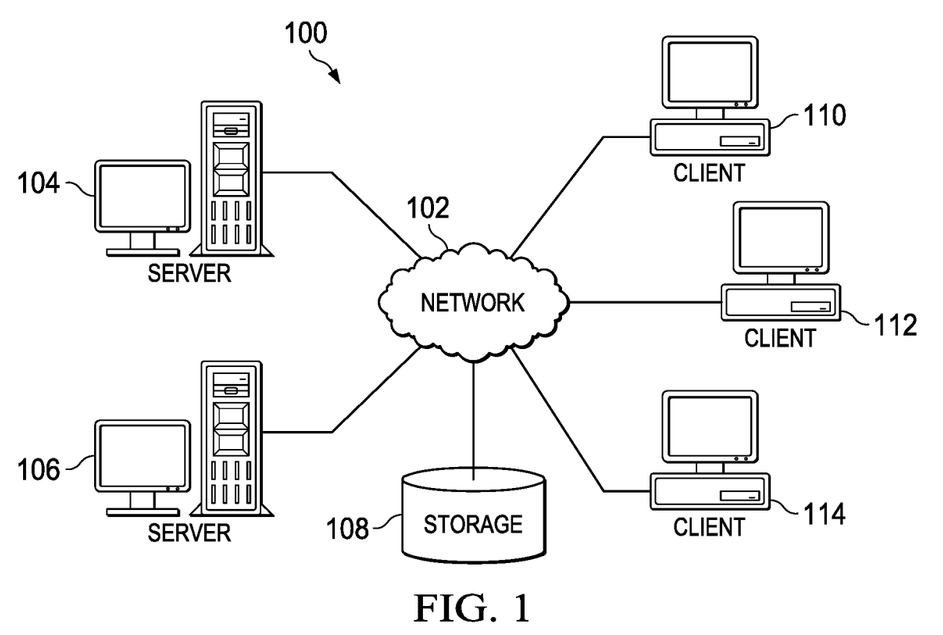
FIG. 1 is a pictorial representation of a network of data processing systems in which illustrative embodiments may be implemented.
Figure 2:
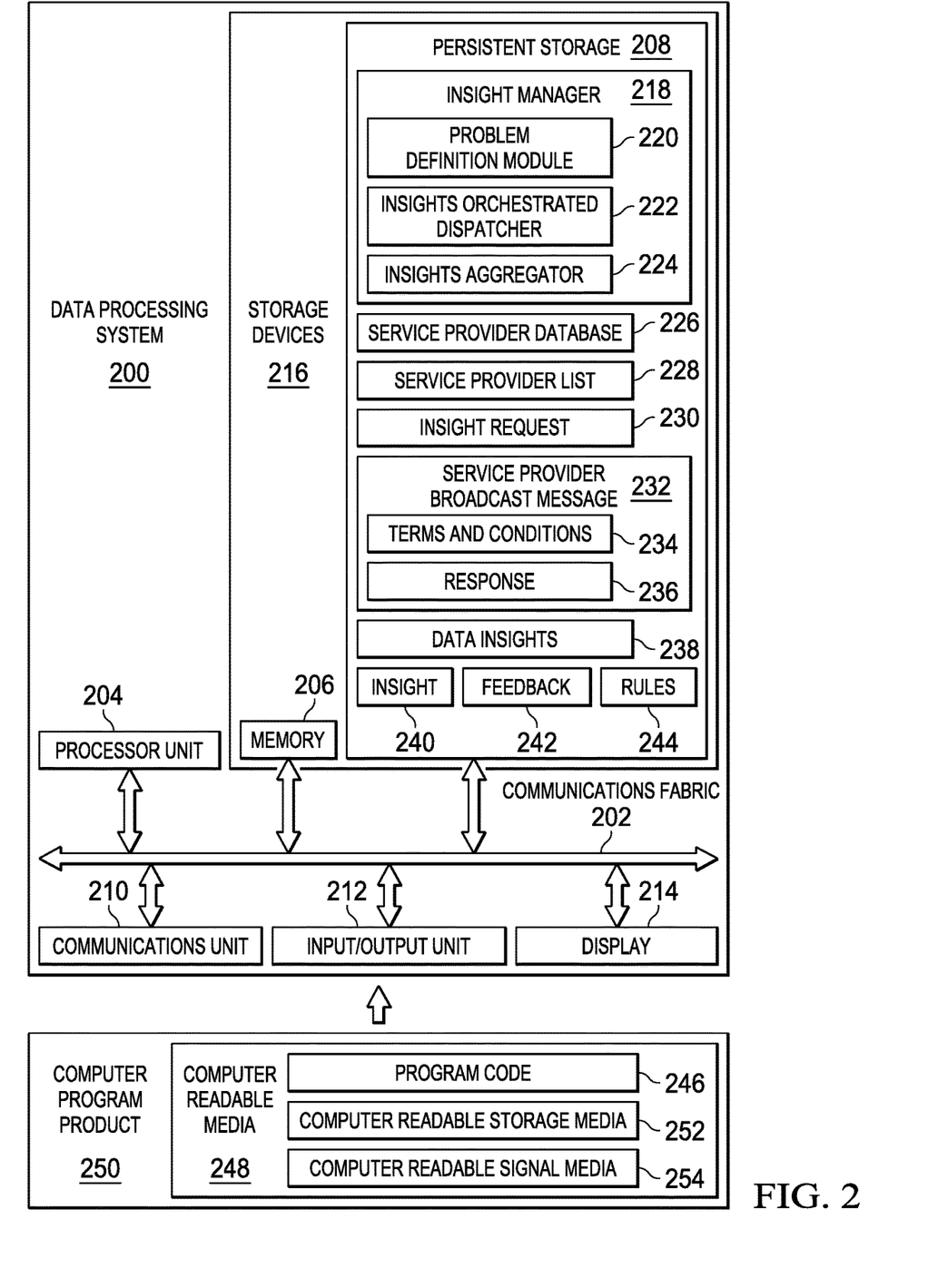
FIG. 2 is a diagram of a data processing system in which illustrative embodiments may be implemented.
Figure 3:
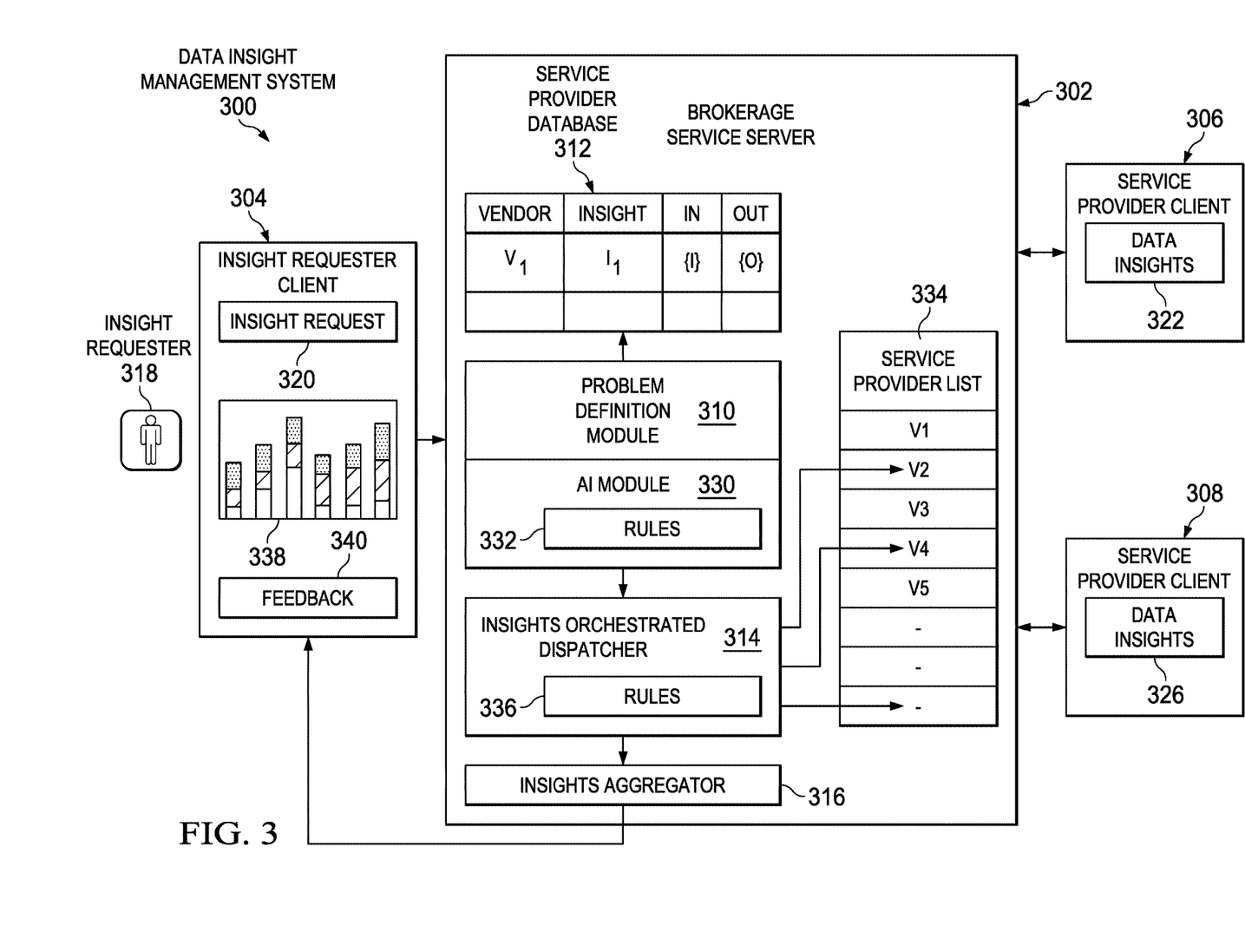
FIG. 3 is a diagram illustrating an example of a data insight management system in accordance with an illustrative embodiment.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide services for generating an aggregate insight on data based on insights on the data provided by data analytics and insights service providers. Also, it should be noted that server 104 and server 106 may each represent a plurality of different servers providing a plurality of different data insight aggregation management services.

Client 110, client 112, and client 114 also connect to network 102. Clients 110, 112, and 114 are clients of server 104 and server 106. Further, server 104 and server 106 may provide information, such as software applications and programs to clients 110, 112, and 114.

In this example, clients 110, 112, and 114 are illustrated as desktop or personal computers with wire or wireless communication links to network 102. However, it should be noted that clients 110, 112, and 114 are meant as examples only. In other words, clients 110, 112, and 114 may include other types of data processing systems, such as, for example, network computers, laptop computers, handheld computers, smart phones, smart watches, personal digital assistants, and the like, with wire or wireless communication links to network 102.

A user, such as an insight requester, corresponding to client 110 may utilize client 110 to request the service provided by server 104 or server 106 of generating an aggregate insight on a set of data based on receiving insights on the set of data from a set of service providers corresponding to a set of component parts of an insight request made by the insight requester. Clients 112 and 114 may, for example, correspond to the set of data analytics and insights service providers. However, it should be noted that client 110 may represent a plurality of client devices corresponding to a plurality of different insight requesters. In addition, clients 112 and 114 may each correspond to a plurality of different data analytics and insights service providers that provide a plurality of different types of analytics and insights.

Storage 108 is a network storage device capable of storing any type of data in a structured format or an unstructured format. In addition, storage 108 may represent a set of one or more network storage devices. Storage 108 may store, for example, names and identifiers for a plurality of different insight requesters that utilize the data insight aggregation management services of server 104 and server 106; profiles corresponding to the different insight requesters; names and identifiers for a plurality of different data analytics and insights service providers; a plurality of different data insights previously provided to different insight requesters; data insight rules corresponding to the different data analytics and insights service providers; and the like. Further, storage 108 may store other data, such as authentication or credential data that may include user names, passwords, and biometric data associated with the insight requests, service providers, and system administrators, for example.

In addition, it should be noted that network data processing system 100 may include any number of additional server devices, client devices, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores insight manager 218. Insight manager 218 generates aggregate insights on data associated with insight requests based on insights on the data provided by multiple data analytics and insights service providers. It should be noted that even though insight manager 218 is illustrated as residing in persistent storage 208, in an alternative illustrative embodiment insight manager 218 may be a separate component of data processing system 200. For example, insight manager 218 may be a hardware component coupled to communication fabric 202 or a combination of hardware and software components. In another alternative illustrative embodiment, a first set of components of insight manager 218 may be located in data processing system 200 and a second set of components of insight manager 218 may be located in one or more client devices.

In this example, insight manager 218 includes problem definition module 220, insights orchestrated dispatcher 222, and insights aggregator 224. However, it should be noted that insight manager 218 may include more or fewer components than illustrated. For example, a single component may be divided into two or more separate components or two or more components may be combined into a single component. Further, insight manager 218 may include other components not shown.

Insight manager 218 utilizes problem definition module 220 to segment a received insight request on a set of one or more component parts and chain the set of component parts in a correct sequence for later assembly after receiving insights on a set of data corresponding to the insight request. Problem definition module 220 may include, for example, a parser module and an artificial intelligence (AI) module to assist in segmenting received insight requests.

Insight manager 218 utilizes insights orchestrated dispatcher 222 to dispatch requests for data insights from a set of one or more service providers corresponding to the components parts of the insight request. Insight manager 218 utilizes insights aggregator 224 to integrate the data insights received from the set of service providers into appropriate analytical and statistical models depending on the type of data corresponding to the insight request. In addition, insights aggregator 224 aggregates and chains the data insights received from the set of service providers in the correct sequence and then generates the requested insight on the data corresponding to the insight request.

Service provider database 226 stores information regarding a plurality of different data analytics and insights service providers. The information may include, for example, names and identifiers for the different service providers, network addresses for each respective service provider, data analytics and insights services provided by each respective service provider, data input and output specifications for each respective service provider, and the like. Insights orchestrated dispatcher 222 utilizes the information stored in service provider database 226 to generate service provider list 228. Service provider list 228 is a ranked list of candidate service providers that insights orchestrated dispatcher 222 determined are capable of providing the data analytics and insights corresponding to a particular data insight request, such as insight request 230.

Insights orchestrated dispatcher 222 utilizes service provider list 228 to select the appropriate set of highest ranking service providers to provide the data analytics and insights corresponding to each particular component part of insight request 230. Insight request 230 may represent any type of request for insight on any set of data, such as, for example, a set of customer data corresponding to a particular business or corporation.

After selecting the appropriate set of service providers to provide the data analytics and insights corresponding to each particular component part of insight request 230, insights orchestrated dispatcher 222 generates service provider broadcast message 232. Insights orchestrated dispatcher 222 sends service provider broadcast message 232 to the selected set of service providers.

In this example, service provider broadcast message 232 includes terms and conditions 234 and response 236. Terms and conditions 234 represent a first portion of service provider broadcast message 232 and contain the terms and conditions that are defined by the insight requester associated with insight request 230. Terms and conditions 234 may include, for example, an auction-based approach or may include specific information, such as client device data specifications, geographic location of the client device, lowest bidder, all data or nothing, and the like. Furthermore, terms and conditions 234 may include other additional parameters, such as, for example, payment conditions, time, cost of service, hardware models, software application levels, and the like.

Response 236 represents a second portion of service provider broadcast message 232. Each service provider in the selected set of service providers utilizes response 236 to indicate whether that particular service provider agrees to terms and conditions 234. Each service provider in the selected set of service providers sends service provider broadcast message 232 containing response 236 to insights orchestrated dispatcher 222.

Each service provider in the selected set of service providers agreeing to terms and conditions 234 receive a request from insights orchestrated dispatcher 222 for their respective portion of data insights 238. Data insights 238 correspond to the component parts of insight request 230. Insights aggregator 224 receives data insights 238 from the set of service providers and aggregates and chains data insights 238 in the correct sequence. Afterward, insights aggregator 224 generates insight 240. Insight 240 represents an aggregation of insights on the set of data corresponding to insight request 230. Moreover, insights aggregator 224 also may generate a set of recommendations corresponding to insight 240. Then, insights aggregator 224 sends insight 240 and any recommendations to the insight requester that made insight request 230.

Subsequently, insight manager 218 may receive feedback 242 from the insight requester. Feedback 242 represents the insight requester's reaction to or opinion of insight 240. For example, the insight requester may indicate in feedback 242 that the information in insight 240 was useless or uninformative. Based on feedback 242, insight manager 218 may generate rules 244. Insight manager 218 may utilize rules 244 to assist insights orchestrated dispatcher 222 in the service provider selection process. For example, a rule in rules 244 may state that one or more particular service providers that submitted one or more portions of data insights 238 for generating insight 240 should never be used in the future and another rule may state that other particular service providers should be given a high ranking for providing the type of insights corresponding to data insights 238.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 246 is located in a functional form on computer readable media 248 that is selectively removable and may be loaded onto or transferred to data processing system 200 for running by processor unit 204. Program code 246 and computer readable media 248 form computer program product 250. In one example, computer readable media 248 may be computer readable storage media 252 or computer readable signal media 254. Computer readable storage media 252 may include, for example, an optical or magnetic disc that is inserted or placed into a drive or other device that is part of persistent storage 208 for transfer onto a storage device, such as a hard drive, that is part of persistent storage 208. Computer readable storage media 252 also may take the form of a persistent storage, such as a hard drive, a thumb drive, or a flash memory that is connected to data processing system 200. In some instances, computer readable storage media 252 may not be removable from data processing system 200.

Alternatively, program code 246 may be transferred to data processing system 200 using computer readable signal media 254. Computer readable signal media 254 may be, for example, a propagated data signal containing program code 246. For example, computer readable signal media 254 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 246 may be downloaded over a network to persistent storage 208 from another device or data processing system through computer readable signal media 254 for use within data processing system 200. For instance, program code stored in a computer readable storage media in a data processing system may be downloaded over a network from the data processing system to data processing system 200. The data processing system providing program code 246 may be a server computer, a client computer, or some other device capable of storing and transmitting program code 246.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 252 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

One problem that businesses and corporations may face is how to access all of their data and analytics effectively and efficiently. Very often analysts have the wrong dataset and/or approach. To determine which sources of data and analytics to use, which analytics is most appropriate for a particular business, and which big data environment is appropriate for that particular business, an analyst may be required to consider multiple factors. For example, one factor may involve trust in terms of the authenticity of the source of data. Other relevant factors may include how comprehensive is the dataset, is the dataset at a granular level that it can provide meaningful results to the business, can the dataset be correlated across other sets of data, and is the business mature and ready enough to act on recommended courses of action to achieve a desired outcome. The need to procure and process disparate forms and sources of data is an ever challenging task for businesses and corporations of all sizes.

Illustrative embodiments provide a data analytics and insights brokerage service that establishes a data analytics service provider broadcast protocol and provide the capability to request and provision data analytics and insights services with specific datasets based on rules and criteria defined by the requesting user (i.e., the insight requester). Illustrative embodiments manage the data analytics and insights provided by service providers using the analytics and insights brokerage service.

Illustrative embodiments deliver personalized data insights to different insight requesters, such as, for example, clusters of users, segments, businesses, corporations, industries, processes, consumers, and the like. Illustrative embodiments deliver the personalized data insights to the different insight requesters using text or word analysis, domain analysis, semantic analysis, sentiment analysis, capability matching, and search queries on structured and unstructured data sources, while considering trust analytics, security compliance, and business objective. The data analytics and insights brokerage service self-learns over time from servicing a predefined set of insights and rules to interpret free form insight requests based on natural language processing (NLP) and artificial intelligence. The data analytics and insights brokerage service also self-learns based on insight requests received from similar insight requesters. The data analytics and insights brokerage service further ranks data insight sources in various dimensions, such as, for example, integrity, completeness, trust, security, and the like, to determine the price and level of service offered to insight requesters. Furthermore, the data analytics and insights brokerage service may provide additional related insights, which were not specifically requested by a particular insight requester, based on insights requested by similar insight requesters in a same cluster of insight requesters. These related insights may be from cross-industries and businesses based on rules derived for selecting data insight sources.

Currently, no automated service exists that will deliver insights to requesters based on the type of insights requested and the cost the requesters are willing to pay, where the requesters do not have to be aware of which data, data sources, and data quality should be leveraged for the best insights, which service providers will provide the data, which related insights that were not requested could benefit the requesters, which contracts will need to be figured out between the service providers of the data, and the like. The service providers may be the same or different entities based on their specialty of analytics, insights, and services provided. The service providers may be members of a private or public consortium and may receive analytics and insights service requests either via a subscription model or a publish model.

Rather than pre-selecting a service provider, illustrative embodiments utilize a service provider broadcast protocol that contains specific data provisioning requirements and issues a data analytics and insights service request to service providers to respond with available data insights associated terms and conditions. The provisioning requirement is accompanied by metadata provided by illustrative embodiments to increase the accuracy of the data insight sought for a particular business objective. The metadata identifies which data insight sources may be used and which data insight sources should not be used depending on the type of data and insight requested.

With reference now to FIG. 3, a diagram illustrating an example of a data insight management system is depicted in accordance with an illustrative embodiment. Data insight management system 300 is a system of software and hardware components for generating an aggregate insight on a set of data based on receiving insights on the set of data from a set of service providers corresponding to a set of component parts of an insight request made by an insight requester. Data insight management system 300 may be implemented in a network of data processing systems, such as network data processing system 100 in FIG. 1.

In this example, data insight management system 300 includes brokerage service server 302, insight requester client 304, service provider client 306, and service provider client 308. However, it should be noted that data insight management system 300 is only meant as an example and not as a limitation on illustrative embodiments. In other words, data insight management system 300 may include any number of brokerage service servers, insight requester clients, service provider clients, and other devices not shown.

Brokerage service server 302 is a data insights brokerage service server that generates aggregate insights on data based on data insights provided by service providers. Brokerage service server 302 may be, for example, server 104 in FIG. 1 or data processing system 200 in FIG. 2. In this example, brokerage service server 302 includes problem definition module 310, service provider database 312, insights orchestrated dispatcher 314, and insights aggregator 316. However, it should be noted that brokerage service server 302 may include more or fewer components than illustrated. Problem definition module 310, service provider database 312, insights orchestrated dispatcher 314, and insights aggregator 316 may be, for example, problem definition module 220, service provider database 226, insights orchestrated dispatcher 222, and insights aggregator 224 in FIG. 2.

Insight requester client 304 is a client device utilized by insight requester 318 to submit insight requests, such as insight request 320, to brokerage service server 302. Insight requester client 304 may be, for example, client 110 in FIG. 1. Service provider client 306 and service provider client 308 also are client devices that provide data insights to brokerage service server 302 based on insight request 320. For example, service provider client 306 provides data insights 322 and service provider client 308 provides data insights 326 that correspond to different component parts of insight request 320. Service provider client 306 and service provider client 308 may be, for example, clients 112 and 114 in FIG. 1.

First, insight requester 318 submits insight request 320 to brokerage service server 302 for insight on a set of data. Insight requester 318 may be, for example, an individual user or a user representing a business, corporation, or the like. Insight request 320 may be, for example, "Give me all social media short text identifiers of people in the United States who are likely to redeem coupons." Insight request 320 may be one of the following types. The first type is a predefined insight supported by brokerage service server 302. In other words, insight requester 318 selected insight request 320 from a list of predefined insights supported by brokerage service server 302. The second type is a natural language insight request. In other words, insight requester 318 submitted insight request 320 in a natural language format. Brokerage service server 302 may utilize, for example, natural language processing to map insight request 320 in a natural language format into the list of predefined insights supported by brokerage service server 302. In addition, it should be noted that brokerage service server 302 may map insight request 320 to one predefined insight or a combination of predefined insights supported by brokerage service server 302.

Next, brokerage service server 302 derives clusters of insight requesters requesting same or similar insights based on their current needs and contexts. If insight requester 318 is an individual user, then brokerage service server 302 may utilize k-means clustering or another unsupervised clustering algorithm to derive the clusters of insight requesters based on attributes, such as, for example, personality traits of the insight requesters, demographics of the insight requesters, computing devices corresponding to the insight requesters, and the like. Brokerage service server 302 determines the current needs and contexts corresponding to the insight requesters using the same attributes. Brokerage service server 302 also may determine the current needs and contexts corresponding to the insight requesters based on the activities and interactions of the insight requesters.

Brokerage service server 302 may determine the current needs and contexts corresponding to the insight requesters based on, for example, the application of natural language processing text analytics, psycholinguistic analytics, descriptive analytics, and clustering models on structured and unstructured data corresponding to the insight requesters. The structured and unstructured data corresponding to the insight requesters may include, for example: 1) insight requester profile data (e.g., age, geographic location, gender, memberships, et cetera); 2) insight requester personality traits (e.g., conservative, aggressive, et cetera); 3) insight requester computing device; 4) previous insight requester insight requests; 5) insight requester cookie/browsing history; 6) insight requester transaction history; 7) insight requester purchase history; 8) insight requester search sequences; 9) insight requester current context derived from activities and interactions of the insight requester; 10) insight requester social media data; 11) insight requester geographic location and time of search; 12) insight requester clickstream data; 13) insight requester survey data; 14) insight requester call center data; and the like.

Brokerage service server 302 ingests the structured and unstructured data to identify predefined data analytical models needed for fast and effective analysis of the data. Brokerage service server 302 develops patterns and trends to detect whether any correlations exist between the insight requesters and what insight requesters are looking for. Brokerage service server 302 may utilize Bayesian inference analysis to analyze causal relationships and establish a predictive inference of correlated data points. Brokerage service server 302 utilizes the set of intent dimensions and values derived by this process to determine what an individual insight requester is looking for (i.e., the insight requester's intent). Brokerage service server 302 groups insight requesters with similar intent together by applying clustering models, such as a k-means unsupervised clustering algorithm, to derive the insight requester clusters per dimension and value. If an insight requester is a business or corporation, brokerage service server 302 may utilize similar clustering methods to find clusters of insight requesters based on attributes, activities, and interactions of the businesses or corporations.

Using the example insight request of "Give me all social media short text identifiers of people in the United States who are likely to redeem coupons" above, brokerage service server 302 clusters insight requesters who are looking for same or similar insights. Brokerage service server 302 identifies common needs and contexts corresponding to insight requesters and derives clusters of insight requesters interested in same or similar insights across cross-industries or businesses. Brokerage service server 302 refines the insight requester clusters over time based on insight requester data and feedback from multiple iterations of this process.

Further, brokerage service server 302 may use k-means clustering or another unsupervised clustering algorithm to find clusters of insight requests. Continuing to use the example insight request above, brokerage service server 302 may correlate similar insight requests to identify closely-related relevant insights, which insight requester 318 may benefit from. For example, brokerage service server 302 may derive a correlation between all social media short text users in the United States who redeem coupons and social media users who visit online sites searching for coupons and social media users who fall in a particular total family income range. This allows brokerage service server 302 to start from a predefined list of insights, data, and feedback from insight requesters and then evolve into a system that allows requests in free form text based on guidelines to the insight requesters on how to form such insight requests. Brokerage service server 302 may leverage natural language processing, text analysis, domain analysis, semantic analysis, and sentiment analysis to interpret these free form insight requests and map these free form insight requests to the closest cluster of insight requests.

Brokerage service server 302 contains a data insights service provider broadcast protocol. A broadcast message following this protocol may consist of a broadcast header section and response header section. The broadcast header section contains the terms and conditions, which are required to be met by responding candidate data insights service providers, set by the insight requester. These terms or conditions may specify, for example, an auction-based approach or may contain specific information, such as device data specifications, geographic location, lowest bidder, all data or nothing, and the like. The terms and conditions also may specify other additional parameters, such as payment conditions, time, cost of service, hardware models, and software application levels.

Problem definition module 310 comprises artificial intelligence (AI) module 330, which breaks down insight request 320 into a set of one or more component parts and chains the component parts in a correct sequence for later assembly by insights aggregator 316. Artificial intelligence module 330 may utilize rules 332 to chain the component parts of insight request 320 in the correct sequence. Problem definition module 310 also may include a parser module to map each component part of insight request 320 to a predefined insight contained in a list of predefined insights supported by brokerage service server 302.

Service provider database 312 is a repository containing a list of known service providers or vendors, their respective services provided, their respective device end points, and their respective data input and data output specifications of their respective services. In response to receiving a data insights service provider broadcast message, a responding candidate service provider or vendor fills in the response section of the broadcast message with the details of the analytics, insights, and services provided by that particular service provider. If insight requester 318 accepts one or more responses, then brokerage service server 302 sends an invitation to deliver the data insights corresponding to the service providers or vendors associated with the one or more accepted responses. Furthermore, brokerage service server 302 also associates those service providers in service provider database 312 with insight request 320 and other information corresponding to insight request 320 for future reference.

Brokerage service server 302 also may utilize a discovery mechanism to identify suitable data insights services for different insight requesters. For example, artificial intelligence module 330 may generate and map rules 332 between clusters of insight requesters and the insights they generally request. Artificial intelligence module 330 stores rules 332 to serve future insight requests by using rules 332 to detect trends and patterns in insight requests, detect clusters of insight requests, and detect exceptions to insight requests.

Depending on the level of service requested and the price paid by insight requester 318, brokerage service server 302 may return additional related insights in a response to insight requester 318 based on insights requested by similar insight requesters in the same cluster as insight requester 318. These additional related insights may be from cross-industries and businesses based on rules 332. Based on feedback received from insight requesters regarding the service provided, brokerage service server 302 may rank the sources of data insights (i.e., the service providers or vendors) to determine or adjust price, trust, and security factors corresponding to those particular services. As a result, brokerage service server 302 may self-learn and adjust over time.

Brokerage service server 302 considers the parameter values in insight request 320, matches insight request 320 with available candidate data insights service providers based on the parameter values, and recommends the highest ranking service providers matching insight request 320. Brokerage service server 302 may utilize, for example, depth and breadth analytics approaches on the structured and unstructured data to map the parameter values of insight request 320 to the sought after data insights. These depth and breadth analytics approaches may include text analysis, domain analysis, semantic analysis, sentiment analysis, capability matching, and search queries on unstructured data. In addition, these depth and breadth analytics approaches also may include data discovery, ad-hoc query and analysis, and reports on structured data. For example, brokerage service server 302 may execute a data source match for requested data by using text analytics to identify the closest set of data for a particular search. Using analytical models to interrogate the semantic layer of the available data insights sources, brokerage service server 302 is able to identify multiple disparate sources of data insights to reach the appropriate data insights corresponding to insight request 320.

Insights orchestrated dispatcher 314 dispatches insight request 320 received from problem definition module 310 to highest ranking matching service providers in service provider list 334. Insights orchestrated dispatcher 314 may utilize rules 336 to rank the service providers, which match insight request 320, in service provider list 334. In this example, the highest ranking matching service providers correspond to service provider client 306 and service provider client 308. Service provider client 306 sends data insights 322 associated with its corresponding component part or parts of insight request 320 to brokerage service server 302. Similarly, service provider client 308 sends data insights 326 associated with its corresponding component part or parts of insight request 320 to brokerage service server 302.

Brokerage service server 302 utilizes insights aggregator 316 to integrate and aggregate data insights 322, and data insights 326 from service provider clients 306 and 308, to apply the appropriate statistical analytics models to the aggregated information, and to generate insight 338 after applying the appropriate statistical analytics models with consideration to trust analytics and security compliance. Brokerage service server 302 also may generate a set of recommendations corresponding to insight 338. Insight 338 may depend on a defined cost structure in brokerage service server 302 that may evolve over time and be adjusted based on data and feedback from multiple iterations of this process.

Brokerage service server 302 sends insight 338 to insight requester client 304 for display to and review by insight requester 318. After reviewing insight 338, insight requester 318 provides feedback 340 to brokerage service server 302. Feedback 340 corresponds to insight 338. Brokerage service server 302 analyzes feedback 340 and generates or adjusts rules 332 and rules 336 based on the analysis of feedback 340.

Brokerage service server 302 measures the outcomes of decisions based on insight 338. Brokerage service server 302 uses these factors to add, remove, or update the set of predefined insights supported by brokerage service server 302, to determine the price of providing insights, and to determine the best data sources for insights for the price paid by insight requesters. Some metrics of return on investment may be, for example, revenue increase, profit increase, earning per share increase, operating margins increase, and the like. Thus, brokerage service server 302 learns and optimizes, based on the outcome and feedback from the return on investment metrics, to add or modify the insight request parameters and adjust the trends, patterns, clusters, and approaches.

Figure 4A:
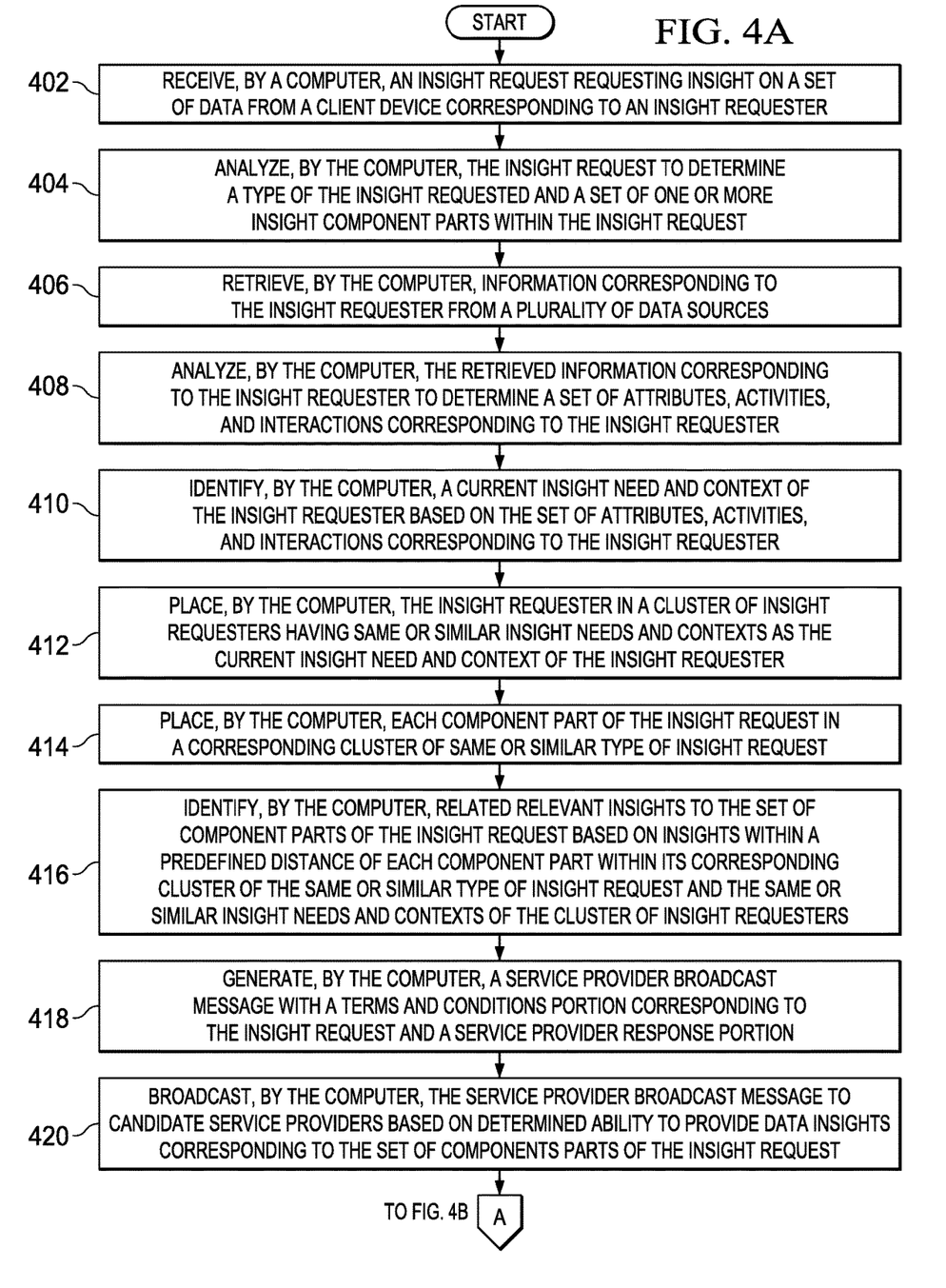
FIGS. 4A-4B are a flowchart illustrating a process for generating insight on a set of data in accordance with an illustrative embodiment.
Figure 4B:
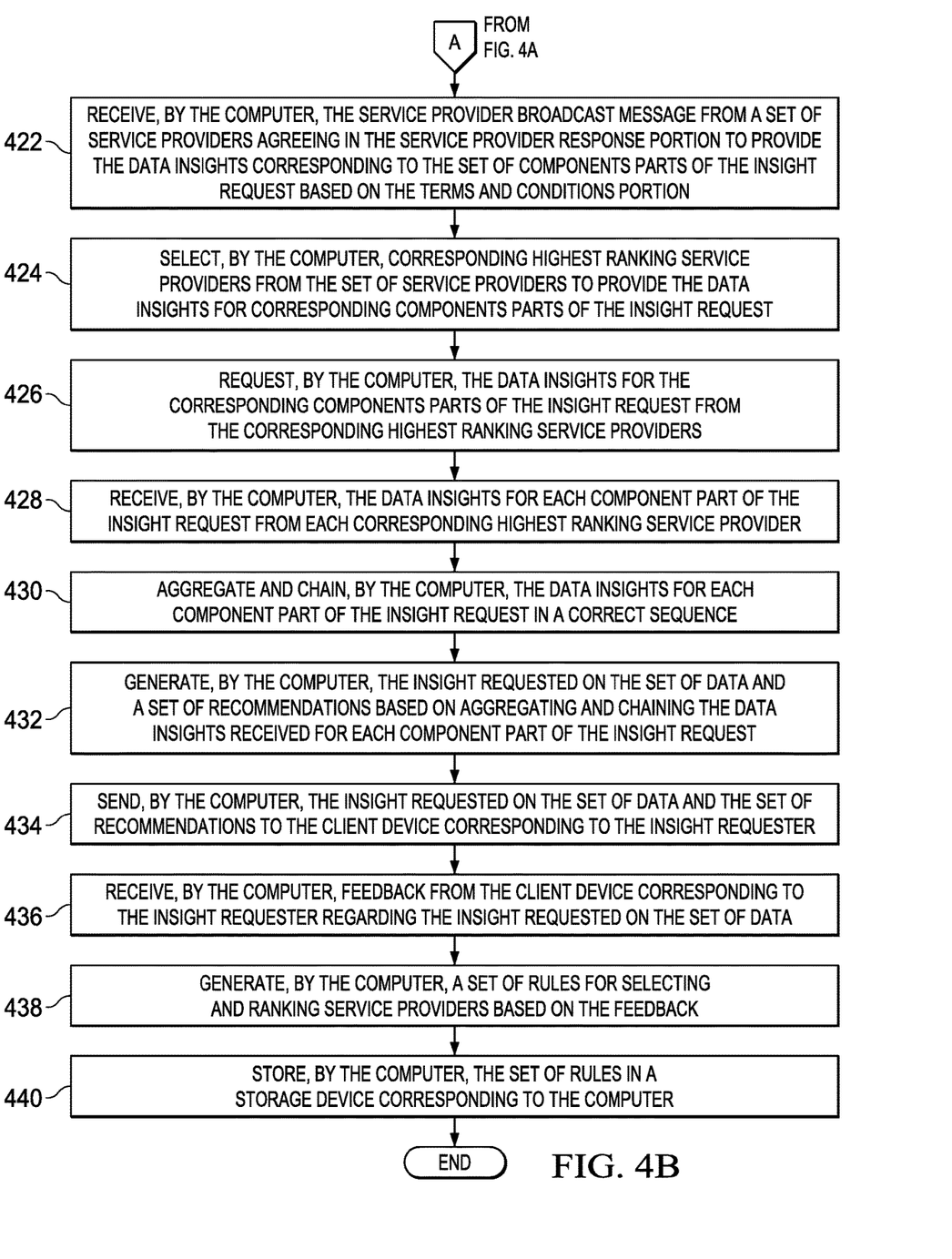

With reference now to FIGS. 4A-4B, a flowchart illustrating a process for generating insight on a set of data is shown in accordance with an illustrative embodiment. The process shown in FIGS. 4A-4B may be implemented in a computer, such as, for example, server 104 in FIG. 1 or data processing system 200 in FIG. 2.

The process begins when the computer receives an insight request requesting insight on a set of data from a client device corresponding to an insight requester (step 402). The computer analyzes the insight request to determine a type of the insight requested and a set of one or more insight component parts within the insight request (step 404). The computer also retrieves information corresponding to the insight requester from a plurality of data sources (step 406).

The computer analyzes the retrieved information corresponding to the insight requester to determine a set of attributes, activities, and interactions corresponding to the insight requester (step 408). The computer identifies a current insight need and context of the insight requester based on the set of attributes, activities, and interactions corresponding to the insight requester (step 410). In addition, the computer places the insight requester in a cluster of insight requesters having same or similar insight needs and contexts as the current insight need and context of the insight requester (step 412).

Further, the computer places each component part of the insight request in a corresponding cluster of same or similar type of insight request (step 414). Furthermore, the computer identifies related relevant insights to the set of component parts of the insight request based on insights within a predefined distance of each component part within its corresponding cluster of the same or similar type of insight request and the same or similar insight needs and contexts of the cluster of insight requesters (step 416).

Afterward, the computer generates a service provider broadcast message with a terms and conditions portion corresponding to the insight request and a service provider response portion (step 418). Then, the computer broadcasts the service provider broadcast message to candidate service providers based on determined ability to provide data insights corresponding to the set of components parts of the insight request (step 420). Subsequently, the computer receives the service provider broadcast message from a set of service providers agreeing in the service provider response portion to provide the data insights corresponding to the set of components parts of the insight request based on the terms and conditions portion (step 422).

The computer selects corresponding highest ranking service providers from the set of service providers to provide the data insights for corresponding components parts of the insight request (step 424). Then, the computer requests the data insights for the corresponding components parts of the insight request from the corresponding highest ranking service providers (step 426). Subsequently, the computer receives the data insights for each component part of the insight request from each corresponding highest ranking service provider (step 428).

The computer aggregates and chains the data insights for each component part of the insight request in a correct sequence (step 430). Afterward, the computer generates the insight requested on the set of data and a set of recommendations based on aggregating and chaining the data insights received for each component part of the insight request (step 432). Then, the computer sends the insight requested on the set of data and the set of recommendations to the client device corresponding to the insight requester (step 434).

Subsequently, the computer receives feedback from the client device corresponding to the insight requester regarding the insight requested on the set of data (step 436). The computer generates a set of rules for selecting and ranking service providers based on the feedback (step 438). In addition, the computer stores the set of rules in a storage device corresponding to the computer (step 440). Thereafter, the process terminates.

Figure 5:
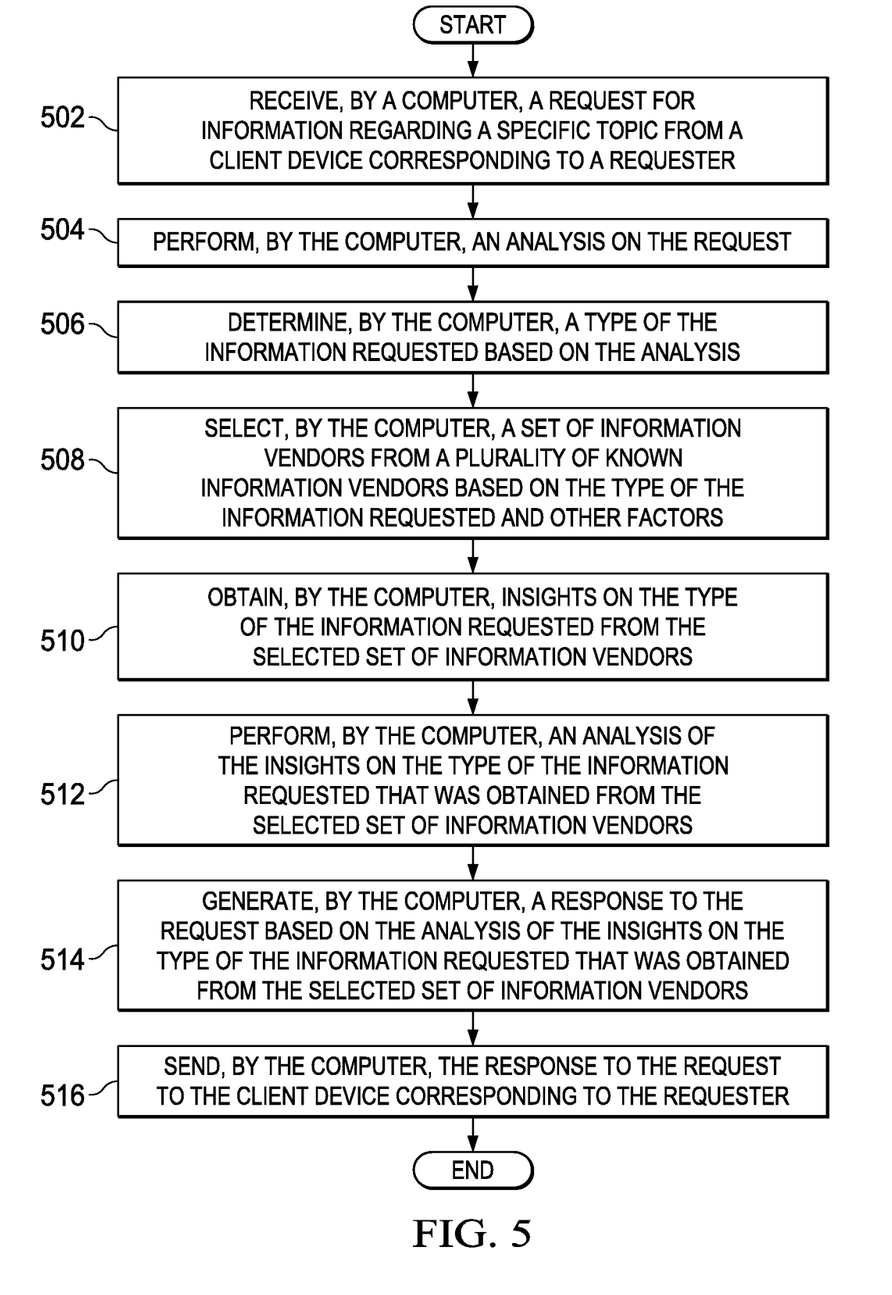
FIG. 5 is a flowchart illustrating a process for generating a response to a data insight request in accordance with an illustrative embodiment.

With reference now to FIG. 5, a flowchart illustrating a process for generating a response to a data insight request is shown in accordance with an illustrative embodiment. The process shown in FIG. 5 may be implemented in a computer, such as, for example, server 104 in FIG. 1 or data processing system 200 in FIG. 2.

The process begins when the computer receives a request for information regarding a specific topic from a client device corresponding to a requester (step 502). The computer performs an analysis on the request (step 504). The computer determines a type of the information requested based on the analysis (step 506).

The computer selects a set of information vendors from a plurality of known information vendors based on the type of the information requested and other factors (step 508). The other factors may include, for example, characteristics corresponding to the requester, characteristics corresponding to information vendors that previously provided data insights to similar requesters, cost, and ranking of each information vendor in the selected set of information vendors. Subsequently, the computer obtains insights on the type of the information requested from the selected set of information vendors (step 510).

The computer performs an analysis of the insights on the type of the information requested that was obtained from the selected set of information vendors (step 512). Then, the computer generates a response to the request based on the analysis of the insights on the type of the information requested that was obtained from the selected set of information vendors (step 514). Afterward, the computer sends the response to the request to the client device corresponding to the requester (step 516). Thereafter, the process terminates.

Thus, illustrative embodiments of the present invention provide a computer-implemented method, computer system, and computer program product for generating insight on a set of data based on analytics of the set of data provided by a set of service providers corresponding to a set of component parts of an insight request made by an insight requester. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating insight on a set of data, the computer-implemented method comprising:

receiving, by a computer, a request for information regarding a specific topic from a client device corresponding to a requester, wherein the request is an insight request requesting insight on a set of data;

performing, by the computer, an analysis on the request, wherein the computer analyzes the insight request to determine a set of insight component parts within the insight request and chains the set of component parts into a sequence using natural language processing;

determining, by the computer, a type of the information requested based on the analysis;

selecting, by the computer, a set of information vendors from a plurality of known information vendors based on the type of the information requested;

obtaining, by the computer, insights on the type of the information requested from the selected set of information vendors;

performing, by the computer, an analysis of the insights on the type of the information requested that was obtained from the selected set of information vendors;

generating, by the computer, a response to the request based on the analysis of the insights on the type of the information requested that was obtained from the selected set of information vendors;

sending, by the computer, the response to the request to the client device corresponding to the requester;

generating, by the computer in response to selecting the set of information vendors, a service provider broadcast message with a terms and conditions portion corresponding to the request and defined by the requestor, and a service provider response portion usable by a given one of the set of information vendors to indicate whether the given one of the set of information venders agrees to terms and conditions in the terms and conditions portion;

broadcasting, by the computer, the service provider broadcast message to candidate service providers based on determined ability to provide data insights corresponding to the set of components parts of the request;

receiving, by the computer, the service provider broadcast message from a set of service providers agreeing in the service provider response portion of the service provider broadcast message to provide the data insights corresponding to the set of components parts of the request based on the terms and conditions portion of the service provider broadcast message; and selecting, by the computer, corresponding highest ranking service providers from the set of service providers to provide the data insights for corresponding components parts of the request, wherein obtaining the insights comprises:

requesting, by the computer responsive to receiving the service provider broadcast message from the set of service providers agreeing in the service provider response portion of the service provider broadcast message to provide the data insights, the data insights for corresponding component parts of the set of component parts corresponding to the insight request from the selected set of information vendors.

2. The computer-implemented method of claim 1, wherein the selecting the set of information vendors is further based on other factors that include characteristics corresponding to information vendors that previously provided data insights to similar requesters.

3. The computer-implemented method of claim 1 further comprising:
   retrieving, by the computer, information corresponding to the requester from a plurality of data sources;
   analyzing, by the computer, the retrieved information corresponding to the requester to determine a set of attributes, activities, and interactions corresponding to the requester;
   identifying, by the computer, a current insight need and context of the requester based on the set of attributes, activities, and interactions corresponding to the requester that are determined by the analyzing of the retrieved information corresponding to the requester and retrieved from the plurality of data sources; and
   placing, by the computer, the requester in a cluster of insight requesters having same or similar insight needs and contexts as the current insight need and context of the requester that is identified based on the set of attributes, activities, and interactions corresponding to the requester that are determined by the analyzing of the retrieved information corresponding to the requester and retrieved from the plurality of data sources.

4. The computer-implemented method of claim 1 wherein the set of component parts are chained in a correct sequence for later assembly after receiving the data insights using artificial intelligence rules by an artificial intelligence component, and further comprising:
   placing, by the computer, each component part of the request in a corresponding cluster of same or similar type of insight request.

5. The computer-implemented method of claim 4 further comprising:
   identifying, by the computer, related insights to the set of component parts of the request based on insights within a predefined distance of each component part within its corresponding cluster of the same or similar type of insight request, wherein the response sent to the client device includes the related insights to the set of component parts of the request based on insights within a predefined distance of each component part within its corresponding cluster of the same or similar type of insight request.

6. The computer-implemented method of claim 4 further comprising:
   receiving, by the computer, the data insights for each component part of the request from each corresponding highest ranking service provider, wherein a given data insight received from a given service provider is directed to a particular insight component part of the insight request and another data insight received from another service provider is directed to another insight component part of the insight request that is different than the particular component part of the request; and
   aggregating and chaining, by the computer, the data insights for each component part of the request in the sequence.

7. The computer-implemented method of claim 6 further comprising:
   generating, by the computer, insight on the information regarding the specific topic based on the aggregating and the chaining of the data insights received for each component part of the request.

8. The computer-implemented method of claim 7 further comprising:
   sending, by the computer, the insight on the information regarding the specific topic to the client device corresponding to the requester;
   receiving, by the computer, feedback from the client device regarding the insight on the information regarding the specific topic;
   adjusting, by the computer, a set of rules for selecting and ranking service providers based on the feedback receiving from the client device regarding the insight on the information regarding the specific topic; and
   storing, by the computer, the set of rules in a storage device corresponding to the computer.

9. A computer system for generating insight on a set of data, the computer system comprising:
   a bus system;
   a storage device connected to the bus system, wherein the storage device stores program instructions; and
   a processor connected to the bus system, wherein the processor executes the program instructions to:
      receive a request for information regarding a specific topic from a client device corresponding to a requester, wherein the request is an insight request requesting insight on a set of data;
      perform an analysis on the request by analyzing the insight request to determine a set of insight component parts within the insight request and chain the set of component parts into a sequence using natural language processing;
      determine a type of the information requested based on the analysis;
      select a set of information vendors from a plurality of known information vendors based on the type of the information requested;
      obtain insights on the type of the information requested from the selected set of information vendors;
      perform an analysis of the insights on the type of the information requested that was obtained from the selected set of information vendors;
      generate a response to the request based on the analysis of the insights on the type of the information requested that was obtained from the selected set of information vendors;
      send the response to the request to the client device corresponding to the requester;
      generate, in response to selecting the set of information vendors, a service provider broadcast message with a terms and conditions portion corresponding to the request and defined by the requestor, and a service provider response portion usable by a given one of the set of information vendors to indicate whether the given one of the set of information venders agrees to terms and conditions in the terms and conditions portion;
      broadcast the service provider broadcast message to candidate service providers based on determined ability to provide data insights corresponding to the set of components parts of the request;
      receive the service provider broadcast message from a set of service providers agreeing in the service provider response portion to provide the data insights corresponding to the set of components parts of the request based on the terms and conditions portion of the service provider broadcast message; and select corresponding highest ranking service providers from the set of service providers to provide the data insights for corresponding components parts of the request, wherein obtain the insights comprises:

request the data insights for corresponding component parts of the set of component parts corresponding to the insight request from the selected set of information vendors responsive to receiving the service provider broadcast message from the set of service providers agreeing in the service provider response portion of the service provider broadcast message to provide the data insights.

10. A computer program product for generating insight on a set of data, the computer program product comprising a computer readable storage medium having program instructions embodied therewith, the program instructions executable by a computer to cause the computer to perform a method comprising:

receiving, by the computer, a request for information regarding a specific topic from a client device corresponding to a requester, wherein the request is an insight request requesting insight on a set of data;

performing, by the computer, an analysis on the request, wherein the computer analyzes the insight request to determine a set of insight component parts within the insight request and chains the set of component parts into a sequence using natural language processing;

determining, by the computer, a type of the information requested based on the analysis;

selecting, by the computer, a set of information vendors from a plurality of known information vendors based on the type of the information requested;

obtaining, by the computer, insights on the type of the information requested from the selected set of information vendors;

performing, by the computer, an analysis of the insights on the type of the information requested that was obtained from the selected set of information vendors;

generating, by the computer, a response to the request based on the analysis of the insights on the type of the information requested that was obtained from the selected set of information vendors;

sending, by the computer, the response to the request to the client device corresponding to the requester;

generating, by the computer in response to selecting the set of information vendors, a service provider broadcast message with a terms and conditions portion corresponding to the request and defined by the requestor, and a service provider response portion usable by a given one of the set of information vendors to indicate whether the given one of the set of information venders agrees to terms and conditions in the terms and conditions portion;

broadcasting, by the computer, the service provider broadcast message to candidate service providers based on determined ability to provide data insights corresponding to the set of components parts of the request;

receiving, by the computer, the service provider broadcast message from a set of service providers agreeing in the service provider response portion to provide the data insights corresponding to the set of components parts of the request based on the terms and conditions portion of the service provider broadcast message; and selecting, by the computer, corresponding highest ranking service providers from the set of service providers to provide the data insights for corresponding components parts of the request, wherein obtaining the insights comprises:

requesting, by the computer responsive to receiving the service provider broadcast message from the set of service providers agreeing in the service provider response portion of the service provider broadcast message to provide the data insights, the data insights for corresponding component parts of the set of component parts corresponding to the insight request from the selected set of information vendors.

11. The computer program product of claim 10, wherein the select the set of information vendors is further based on other factors that include characteristics corresponding to information vendors that previously provided data insights to similar requesters.

12. The computer-implemented method of claim 1, wherein the service provider response portion of the received service provider broadcast message includes details of analytics, insights and services provided by a particular service provider.

13. The computer program product of claim 10, wherein the service provider response portion of the received service provider broadcast message includes details of analytics, insights and services provided by a respective service provider.

14. The computer-implemented method of claim 1, wherein the terms and conditions portion of the service provider broadcast message contains terms and conditions which are required to be met by a responding service provider.

15. The computer program product of claim 10, wherein the terms and conditions portion of the service provider broadcast message contains terms and conditions which are required to be met by a responding service provider.

* * * * *